(12) United States Patent
Huttunen et al.

(10) Patent No.: US 12,420,601 B2
(45) Date of Patent: Sep. 23, 2025

(54) EMBEDDED CONNECTING ARRANGEMENT FOR TIRE PRESSURE MEASURING SYSTEM

(71) Applicant: Teknologian tutkimuskeskus VTT Oy, Espoo (FI)

(72) Inventors: Arttu Huttunen, Espoo (FI); Kimmo Keränen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 18/956,738

(22) Filed: Nov. 22, 2024

(65) Prior Publication Data

US 2025/0206084 A1 Jun. 26, 2025

(30) Foreign Application Priority Data

Dec. 22, 2023 (FI) ...................................... 20236429

(51) Int. Cl.
*B60C 23/04* (2006.01)
(52) U.S. Cl.
CPC ...... *B60C 23/0493* (2013.01); *B60C 23/0433* (2013.01)
(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/0462; B60C 23/20; B60C 23/041; B60C 23/0411; B60C 23/0479; B60C 23/0444; B60C 11/246; B60C 23/064; B60C 23/0488;

(Continued)

(56) References Cited

U.S. PATENT DOCUMENTS

| | | | |
|---|---|---|---|
| 5,500,065 A | * | 3/1996 | Koch .................. B60C 23/0442 156/123 |
| 2004/0150499 A1 | * | 8/2004 | Kandler .............. B60C 23/0408 336/40 |

(Continued)

FOREIGN PATENT DOCUMENTS

| DE | 102012216577 A1 | 9/2012 |
|---|---|---|
| DE | 102024103156 A1 * | 8/2024 |

(Continued)

OTHER PUBLICATIONS

International Search Report issued for Application No. PCT/FI2024/050436, dated Nov. 20, 2024, (3 pages).

(Continued)

*Primary Examiner* — Andre J Allen
(74) *Attorney, Agent, or Firm* — Meunier Carlin & Curfman LLC

(57) ABSTRACT

A tyre pressure arrangement according to the invention has a tyre pressure sensor (3) and a radio frequency communication device (5) and an identification part (6). The arrangement has also an electronic part (7) comprising said radio frequency communication device (5) and identification part (6), and a pressure sensor reading electronics (4). The electronic part (7) is arranged to be embedded to the rubber of a tyre (1), the tyre pressure sensor (3) being in connection with the electronic part (7) and arranged to be attached on the internal surface (9) of the tyre.

8 Claims, 1 Drawing Sheet

(58) Field of Classification Search
CPC ..... B60C 11/24; B60C 23/007; B60C 23/062;
B60C 23/0401; B60C 23/0413; B60C
23/06; B60C 23/043; B60C 23/0452;
B60C 23/0498; B60C 23/02; B60C
23/0467; B60C 99/006; B60C 2019/004;
B60C 23/0428; B60C 23/0442; B60C
11/243; B60C 23/009; B60C 23/0425;
B60C 23/00354; B60C 23/004; B60C
23/045; B60C 23/0464; B60C 23/04985;
B60C 23/003; B60C 23/00318; B60C
23/0403; B60C 23/0406; B60C 23/0472;
B60C 23/066; B60C 23/00; B60C
23/00372; B60C 29/02; B60C 23/006;
B60C 11/00; B60C 23/0454; B60C
23/044; B60C 23/0455; B60C 23/008;
B60C 23/0483; B60C 25/002; B60C
23/0461; B60C 23/0474; B60C 23/0489;
B60C 23/0491; B60C 29/064; B60C
23/0415; B60C 23/00363; B60C 23/0459;
B60C 23/0471; B60C 23/0481; B60C
23/0476; B60C 11/0318; B60C 23/0477;
B60C 2200/02; B60C 23/002; B60C
23/0437; B60C 2019/005; B60C 23/042;
B60C 23/0405; B60C 23/0422; B60C
23/0423; B60C 23/0466; B60C 13/001;
B60C 29/06; B60C 23/0447; B60C
25/132; B60C 23/0427; B60C 23/0449;
B60C 9/18; B60C 25/00; B60C 23/065;
B60C 23/0484; B60C 23/0486; B60C
19/003; B60C 13/00; B60C 23/00336;
B60C 23/00345; B60C 23/08; B60C
17/00; B60C 2019/006; B60C 23/001;
B60C 25/142; B60C 5/00; B60C 17/02;
B60C 23/0445; B60C 23/0457; B60C
29/00; B60C 11/0083; B60C 25/145;
B60C 9/02; B60C 11/0332; B60C 25/18;
B60C 29/066; B60C 11/13; B60C
23/0418; B60C 23/0469; B60C 23/068;
B60C 23/12; B60C 99/00; B60C 23/0432;
B60C 25/138; B60C 5/14; B60C 11/03;
B60C 23/005; B60C 25/005; B60C
25/007; B60C 25/0554; B60C 3/00; B60C
11/11; B60C 17/04; B60C 17/06; B60C
23/0435; B60C 23/063; B60C 23/10;
B60C 25/14; B60C 29/005; B60C 29/062;
B60C 99/003; B60C 11/032; B60C 11/12;
B60C 13/003; B60C 15/06; B60C 19/001;
B60C 23/126; B60C 23/127; B60C 23/16;
B60C 29/068; B60C 3/04; B60C 9/20;
B60C 11/01; B60C 11/0302; B60C 13/02;
B60C 25/056; B60C 29/04; B60C 5/142;
B60C 1/0016; B60C 11/0304; B60C
11/0306; B60C 19/08; B60C 2009/2038;
B60C 2011/0374; B60C 2011/0388;
B60C 2011/1213; B60C 2011/1231;
B60C 2011/1245; B60C 2200/04; B60C
2200/065; B60C 23/00305; B60C 23/067;
B60C 23/131; B60C 23/135; B60C
23/137; B60C 23/18; B60C 25/02; B60C
11/02; B60C 17/0009; B60C 19/002;
B60C 19/12; B60C 2019/007; B60C
23/00347; B60C 25/05; B60C 5/001;
B60C 5/22; B60C 1/0008; B60C 11/0058;
B60C 11/0311; B60C 11/033; B60C
11/1218; B60C 11/124; B60C 11/1384;
B60C 13/04; B60C 15/0036; B60C
15/024; B60C 17/041; B60C 17/066;
B60C 2007/005; B60C 2009/0071; B60C
2009/2022; B60C 2009/2025; B60C
2011/0358; B60C 2011/1254; B60C
2017/068; B60C 2200/06; B60C 2200/12;
B60C 2200/14; B60C 23/121; B60C
23/123; B60C 23/133; B60C 25/0503;
B60C 25/0515; B60C 25/0521; B60C
25/0551; B60C 25/15; B60C 25/16; B60C
29/007; B60C 3/06; B60C 5/002; B60C
5/02; B60C 5/20; B60C 7/00; B60C 7/12;
B60C 9/005; B60C 9/1807; B60C 9/28;
B60C 11/0041; B60C 11/04; B60C
2009/0276; B60C 2011/0033; B60C
2011/0346; B60C 2015/0617; B60C
2015/0678; B60C 2015/0682; B60C
2200/00; B60C 23/085; B60C 25/0548;
B60C 25/185; B60C 7/105; B60C 7/107;
B60C 9/22; G01M 17/02; G01M 17/022;
G01M 17/027; G01M 17/021; G01M
17/024; G01M 17/025; G01M 17/013;
G01M 17/007; G01M 1/045; G01M
17/06; G01M 1/326; G01M 1/02; G01M
1/30; G01M 17/0074; G01M 5/0058;
G01M 1/26; G01M 17/04; G01M 1/225;
G01M 17/065; G01M 17/0072; G01M
17/10; G01M 7/00; G01M 1/16; G01M
99/00; G01M 7/08; G01M 1/34; G01M
17/028; G01M 17/045; G01M 3/3218;
G01M 3/40; G01M 1/04; G01M 17/08;
G01M 17/03; G01M 5/0091; G01M
1/365; G01M 13/04; G01M 5/0066;
G01M 1/08; G01M 1/22; G01M 13/027;
G01M 5/0033; G01M 1/00; G01M
15/044; G01M 17/00; G01M 3/24; G01M
3/2876; G01M 5/0075; G01M 1/06;
G01M 1/12; G01M 1/122; G01M 1/24;
G01M 1/32; G01M 1/36; G01M 11/081;
G01M 13/023; G01M 13/025; G01M
17/0076; G01M 3/022; G01M 3/042;
G01M 3/045; G01M 3/147; G01M 3/227;
G01M 3/3236; G01M 5/0016; G01M
5/0025; G01M 5/0083; G01M 7/022;
G01M 7/025; G01M 7/04; G01M 7/06;
G01M 9/02; G01M 9/04; G01M 99/002;
G01M 99/004; G01M 1/14; G01M 1/28;
G01M 3/002; G01M 3/04; G01M 7/02;
G01M 9/06
USPC .................................. 73/146–146.8
See application file for complete search history.

(56) References Cited

U.S. PATENT DOCUMENTS

| | | | |
|---|---|---|---|
| 2004/0196148 A1* | 10/2004 | Albuquerque | B60C 23/20 340/442 |
| 2006/0090558 A1* | 5/2006 | Raskas | B60C 19/00 73/146 |
| 2006/0238356 A1* | 10/2006 | Tucker | H01Q 1/2241 340/447 |
| 2007/0222614 A1* | 9/2007 | Rapp | B60C 19/00 340/572.8 |
| 2012/0291537 A1* | 11/2012 | Honda | B60C 23/0447 73/146 |

(56) References Cited

U.S. PATENT DOCUMENTS

| | | |
|---|---|---|
| 2017/0174013 A1 | 6/2017 | Fenkanyn et al. |
| 2020/0101797 A1* | 4/2020 | Ojala .................... B60C 11/246 |
| 2020/0247193 A1* | 8/2020 | Nakajima ........... B60C 23/0433 |
| 2023/0144232 A1 | 5/2023 | Caccami et al. |

FOREIGN PATENT DOCUMENTS

| | | | |
|---|---|---|---|
| DE | 102024104657 A1 * | 9/2024 | |
| DE | 102024104659 A1 * | 9/2024 | |
| EP | 3272558 A1 | 1/2018 | |
| JP | 5281385 B2 | 9/2013 | |
| JP | 2017154648 A | 9/2017 | |
| JP | 2017156258 A | 9/2017 | |
| WO | WO-2019054213 A1 * | 3/2019 | ............. B60C 19/00 |
| WO | WO-2019170998 A1 * | 9/2019 | ......... B60C 23/0452 |
| WO | WO-2024180873 A1 * | 9/2024 | |

OTHER PUBLICATIONS

Office Action for Finnish Patent No. FI20236429, dated Jun. 24, 2024, (5 pages).

Search Report for Finnish U.S. Appl. No. 20/236,429, dated Jun. 24, 2024, 2 pages.

\* cited by examiner

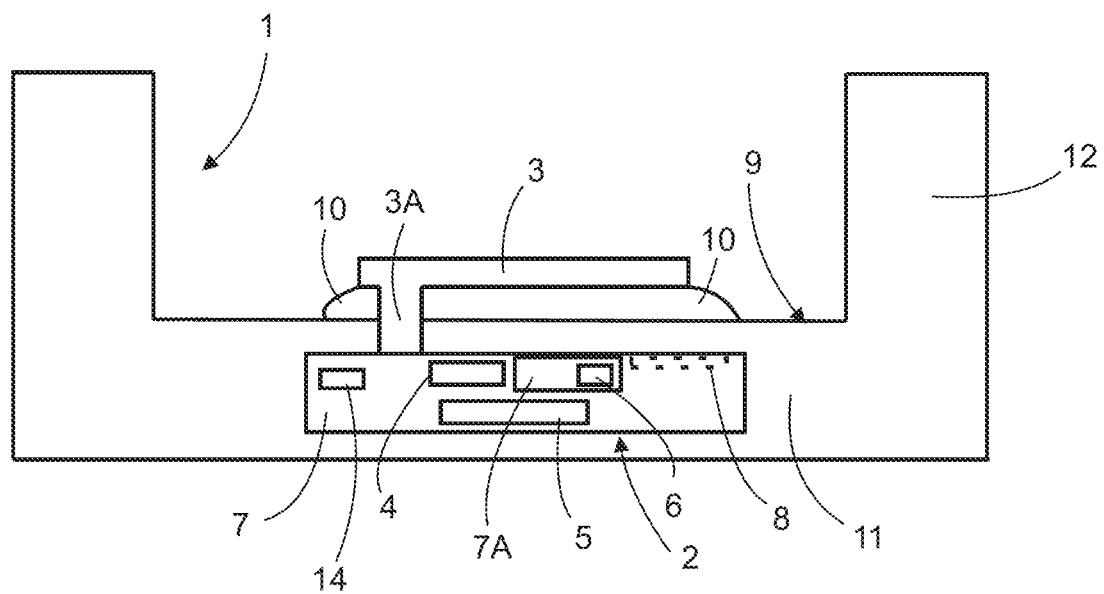

EMBEDDED CONNECTING ARRANGEMENT FOR TIRE PRESSURE MEASURING SYSTEM

FIELD OF TECHNOLOGY

The invention relates to arrangements to measure a tyre pressure, especially a pressure of a vehicle tyre.

PRIOR ART

It is known to measure a pressure inside a vehicle tyre utilizing a pressure sensor. In order to communicate measured pressure data outside to a vehicles CPU or other unit, a wireless communication system, like a RFID (Radio Frequency Identification) system, is used.

A known pressure sensor module is either added to the valve of the tyre or embedded into the inner surface of the rubber. Anyway, the pressure sensor needs an access to the inner atmosphere of the tyre. Therefore, different cavity or pipe solutions exist. A separate identification tag may be embedded into the rubber.

Current solutions are relatively complicated and makes a manufacturing of a tyre even more challenging as it already is.

SHORT DESCRIPTION

The object of the invention is to make an alternative solution in order to alleviate the problems of known embodiments. The object is achieved in a way described in the independent claims. Dependent claims illustrate different embodiments of the invention.

An arrangement to measure a tyre pressure according to the invention has a tyre pressure sensor and a radio frequency communication device and an identification part. The arrangement has also an electronic part comprising said radio frequency communication device and identification part, and also a pressure sensor reading electronics. The electronic part is arranged to be embedded to the rubber of a tyre, the tyre pressure sensor being in connection with the electronic part and arranged to be attached on the internal surface of the tyre.

LIST OF FIGURES

In the following, the invention is described in more detail by reference to the enclosed drawings, where FIG. 1 illustrates an example of an inventive arrangement.

DESCRIPTION OF THE INVENTION

FIG. 1 illustrates a schematic example of the inventive arrangement. It shows a tyre 1 and the invention very schematically, not showing, for example, all elements of the tyre.

The arrangement to measure a tyre pressure according to the invention has a tyre pressure sensor 3 and a radio frequency communication device 5 and an identification part 6. The arrangement has also an electronic part 7 comprising said radio frequency communication device 5 and identification part 6, and also a pressure sensor reading electronics 4. The electronic part 7 is arranged to be embedded to a rubber of a tyre 1, the tyre pressure sensor 3 being in connection with the electronic part 7 and arranged to be attached on an internal surface 9 of the tyre.

Said radio frequency communication device 5, identification part 6, and the pressure sensor reading electronics 4 are embedded or integrated within the electronic part. The identification part is conveniently a data part in the memory 7A of the electronic part. Other possible elements can also be embedded or integrated within the electronic part 7.

Optionally the electronic part 7 may also comprise a temperature sensor 8. Utilizing temperature information, wearing of the tyre can be followed or predicted more accurately. The arrangement, i.e. the electronic part 7 and the pressure sensor 3 (having also the connection 3A to the electronic part 7) is an integral structure. The electronic part is arranged to be embedded into the rubber 11 of the tyre 1, in the example of FIG. 1, into the rubber of the tread. The pressure sensor 3, being an analog element, is arranged to be situated on the internal surface 9 of the tyre, where it is capable of measuring the tyre pressure in the space restricted by a rim (not shown in FIG. 1), and the tread 2 and the sidewalls 12 of the tyre 1. The tyre pressure sensor 3 is arranged to utilize a piezoresistive ink or a capacitive structure or another suitable technique.

As said, the tyre pressure sensor 3 is arranged to be attached on an internal surface 9 of the tyre. A suitable adhesive 10 can be used. A curing process may also be utilised for attaching the tyre pressure sensor when manufacturing the tyre 1.

The radio frequency communication device 5 and an identification part 6 can be made utilizing different techniques. The radio frequency communication device 5 communicates with, for example, a vehicle's CPU (Central Processing Unit) or another processing unit in the vehicle. The identification part 6 identifies the tyre 1.

In order to have power, the electronic part 7 comprises a power source or a wireless power coupling element 14. The power source can be a battery. The wireless coupling element can be formed using different techniques.

Because the invention has an integrated structure, a tyre manufacturing is not so complicated as in the prior art solutions, since only one structure is needed to be added into the tyre. In addition, there is no need to make cavity through the rubber of tyre for sensing the pressure of the tyre. The inventive structure is attached into the rubber of the tyre during manufacturing process, more specifically when curing the tyre (or a part of the tyre). If needed, adhesive may used in order to make sure that the pressure sensor is properly attached to the internal surface 9 of the tyre.

Since the electronic part 7 having the identification part 6 is embedded/integrated among the electronic part 7 in the rubber of the vehicle's tyre, it is hard to remove it from the tyre. Some people tend to remove the identification tags away from the tyres for instance due to security concerns or for counterfeit purposes. However, legislation may require to use the identification parts/tags so that the tyres can be monitored through their life time. The identification parts help also recycling processes. A separate identification tag is not needed in the inventive arrangement.

As said above, FIG. 1 is very schematic. The dimensions of the inventive arrangement are exaggerated and in real embodiment they are smaller and thinner, especially when comparing, for example, to tyre sizes of passenger cars. The electronic part 7 may also comprises other elements than described above.

It is evident from the above that the invention is not limited to the embodiments described in this text but can be implemented in many other different embodiments within the scope of the independent claims.

The invention claimed is:

1. An arrangement to measure a tyre pressure, the arrangement comprising:
   a tyre pressure sensor;
   a radio frequency communication device; and
   an identification part,
   wherein an electronic part comprises the radio frequency communication device, the identification part, and a pressure sensor reading electronics,
   wherein the electronic part is embedded to a rubber of a tyre,
   wherein the tyre pressure sensor is connected to the electronic part by a connection extending from the electronic part embedded within the tyre to an internal surface of the tyre,
   wherein the tyre pressure sensor is arranged to be attached on an internal surface of the tyre.

2. The arrangement according to claim 1, wherein the electronic part comprises also a temperature sensor.

3. The arrangement according to claim 1, wherein the electronic part comprises a power source, being a battery or a wireless power coupling element.

4. The arrangement according to claim 1, wherein the tyre pressure sensor is arranged to utilize a piezoresistive ink or a capacitive structure.

5. The arrangement according to claim 1, wherein the arrangement is an integral structure.

6. The arrangement according to claim 5, wherein the identification part is integrated with the electronic part.

7. The arrangement according to claim 1, wherein the tyre pressure sensor is attached to the internal surface of the tyre by an adhesive.

8. The arrangement according to claim 1, wherein only the tyre pressure sensor is exposed on the internal surface of the tyre.

* * * * *